United States Patent [19]
Collins et al.

[11] Patent Number: 6,031,847
[45] Date of Patent: Feb. 29, 2000

[54] METHOD AND SYSTEM FOR DESKEWING PARALLEL BUS CHANNELS

[75] Inventors: Hansel Anthony Collins, Mountain View; Paul Everhardt, Sunnyvale; David Parry, San Jose; Greg Chesson, Palo Alto, all of Calif.

[73] Assignee: Silicon Graphics, Inc, Mountain View, Calif.

[21] Appl. No.: 08/886,559

[22] Filed: Jul. 1, 1997

[51] Int. Cl.[7] .................................................. H04L 7/02
[52] U.S. Cl. ........................ 370/508; 370/517; 375/371
[58] Field of Search .................................. 370/503, 506, 370/507, 508, 516, 517, 518; 375/356, 371, 372

[56] References Cited

U.S. PATENT DOCUMENTS

| | | | |
|---|---|---|---|
| 4,677,618 | 6/1987 | Haas et al. | 370/517 |
| 5,138,635 | 8/1992 | Ballance | 375/356 |
| 5,544,203 | 8/1996 | Casasanta et al. | 370/517 |
| 5,621,774 | 4/1997 | Ishibashi et al. | 375/371 |
| 5,734,685 | 3/1998 | Bedell et al. | 375/356 |
| 5,841,468 | 11/1998 | Wright | 348/6 |
| 5,844,908 | 12/1998 | McCallan | 370/518 |

*Primary Examiner*—Chau Nguyen
*Assistant Examiner*—Eva Tang
*Attorney, Agent, or Firm*—Wagner, Murabito & Hao LLP

[57] ABSTRACT

The present invention comprises a dynamic skew compensation circuit. The present invention includes a receiver, a plurality of channel inputs built into the receiver, and a delay stack structure coupled to the plurality of channel inputs. The receiver is adapted to accept data from a parallel data transfer cable. The channel inputs couple to each of the individual communications channels which comprise the parallel data transfer cable. The delay stack structure includes a plurality of delay stacks, each coupled to a respective channel input. Each delay stack dynamically selects an additional delay amount for its respective communications channel such that each communications channel of the parallel data transfer cable is deskewed with respect to the others. In so doing, the distances across which data can be received and the speeds at which data is transferred via the parallel data transfer cable is increased.

30 Claims, 13 Drawing Sheets

METHOD AND SYSTEM FOR DESKEWING PARALLEL BUS CHANNELS

FIELD OF THE INVENTION

The field of the present invention pertains to data communications between digital systems. More particularly, the present invention relates to a method and system for high performance parallel data communication between digital systems.

BACKGROUND OF THE INVENTION

The field of data communications represents one of the most rapidly evolving technologies in wide spread use today. Data communications and data processing has become important to virtually every segment of the nation's economy. Whole new industries and companies have organized around the need for, and the provision of, data communications. Through the use of specialized semiconductors for signal processing and data compression, various multimedia applications are evolving which orient data communications to the transport of voice, data, and video information, the types of information desired by the everyday consumer.

Recently, the computer and data processing industries are seeing a large expansion in the requirements for high performance, high speed data communications, particularly, data commnunications between computer systems. For example, it is becoming increasingly common for large institutions and companies to link several "server" computer systems, via high speed data links, to form a very powerful "virtual" computer system. Dedicated technology has been developed specifically to adapt servers to form such "clusters". Clustering technology is increasingly being used to share very large processing jobs among several computer systems, since it is less expensive to link several smaller systems to tackle a large job than to install a single large system to accomplish the same task. With such technology, the data communications between the computer systems becomes very critical.

Data is commonly transferred between computer systems and terminals by changes in the current or voltage on a metal wire, or channel, between the systems. Alternatively, fiber optics, glass fibers optimized for conducting light, convey data as pulses or changes in light. A data transmission in which a group of bits moves over several channels simultaneously is referred to as a parallel transmission. A data transmission where the bits move over a single channel, one after the other, is referred to as a serial transmission. Computers and other data processing systems which are located near one another normally use parallel transmission because it is much faster.

As distances between systems increase, parallel transmission increasingly suffers a number of limitations. As the distances between systems increase, the cost of the larger number of channels (e.g., copper wires) used in parallel transmission increases. In addition, as the distances increase, the difficulty of accurately receiving and transmitting the electrical pulses comprising the information increases. Because of this, serial transmission is typically utilized for transmission over longer distances. However, as described above, serial transmission uses only a single data transmission channel.

While serial transmission has the advantage of being less expensive with regard to the cabling between systems, and while serial transmission does not have the same types of problems with regard to accurately transmitting and receiving the electrical pulses, total data throughput is not as fast. For the demanding top end applications discussed above (e.g., computer system clustering), high data throughput is imperative.

Prior Art FIG. 1 shows a typical prior art parallel data transmission system 100. System 100 includes a transmitter 101, four data transmission channels (hereafter channels), and a receiver 102. The four channels, channel 0, channel 1, channel 2, and channel 3, are copper wires designed to transmit electrical pulses (e.g., voltage pulses) representing bits of information. It should be noted, however, that the channels could also be fiber optic lines adapted to convey information as light pulses.

Within transmitter 101, four bits of word 103, are shown. The bits of word 103 represent a data "word" (e.g., the group of bits transmitted simultaneously) being transmitted from transmitter 101 down channels 0–3. In the present example, each bit of the word is a positive voltage pulse representing a logical one (e.g., 1111 binary), however, it should be understood that word 103 could be some other value (e.g., 0100) and that some or all of the voltage pulses representing the bits could be negative as opposed to positive. As shown, the individual bits comprising word 103 are synchronous with respect to their rising and falling edges. The bits of word 103, after they are received at receiver 102, are shown as word 104. The individual bits comprising word 104 are still synchronous. Hence, receiver 102 has no trouble sampling the electrical pulses conducted via channels 0–4 to recreate word 103.

With reference now to Prior Art FIG. 2A, a data transmission system 200 is shown. System 200 is similar to system 100 except that the distance between transmitter 101 and receiver 102 is greater. Accordingly, channels 0–3 are longer. As briefly described above, as distances increase, the difficulties in accurately transmitting electrical pulses over the longer channels increase.

Word 103 shows four bits for transmission (e.g., 1111) via channels 0–3. As with system 100, the four bits are synchronous with respect to their rising and falling edges. However, word 105 shows the four bits after transmission via the longer channels 0–3. Due to the inherent characteristics of the longer channels, among other factors, the bits of word 105 are "skewed". The individual bits are no longer synchronous as they are received by receiver 102. Herein lies a major problem with parallel transmission in accordance with the prior art.

Referring now to Prior Art FIG. 2B, a graph 250 of the bits comprising the received word 105 is shown with respect to time. The horizontal direction of graph 250 represents the sampling time of receiver 102. The vertical direction of graph 250 represents the voltage of the individual bits. The vertical line represents sample time $t_s$. To detect the information conveyed by channels 0–3, receiver 102 samples the voltage level of the channels synchronous with the expected arrival time of word 105. The expected arrival time can be determined through a number of techniques. For example, the scheme most often used is to sample with respect to a clock signal, transmitted through its own dedicated channel (not shown). This is commonly referred to as source synchronous clocking, since the clock used for data recapture is produced by the transmitter (source) and transmitted along with the data. Once the sample time ts is determined, the voltage levels of channels 0–3 are sampled. The problem, however, is that due to the increased distance, the bits of word 105 are no longer synchronous.

Thus, at sample time $t_s$, $b_0$ is sampled "high" and $b_2$ is sampled high, however, $b_1$ is erroneously sampled "low". In addition, $b_3$ is indeterminate due to the fact that $t_s$ occurs during $b_3$'s transition from low to high. Consequently, $b_3$ is unpredictably sampled either high or low (resulting in word 103 sampling as X101). Word 105 is skewed with respect to word 103. Although word 103 was synchronous when it was originally transmitted, the effects of the transmission through the longer channels 0–3 result in the skewing of the individual bits comprising the word, resulting in word 105 as shown in FIG. 2B. The information conveyed by word 105 is thus corrupted and lost. While system 100 functioned nominally, system 200, due to the increased transmission distance, is unable to reliably transfer data at the same bit rates.

The transmission of parallel data over long distances is affected by different propagation delays of the channels. This holds true whether the channels are metal or fiber optic (although the skewing effect per unit distance observed through fiber optic channels is not as severe). This difference in propagation delays causes the arrival times of the individual data bits at the destination receiver to be different. The difference between the bit arrival times is referred to as skew. Where the channel lengths are kept relatively low (e.g., under 1 to 3 meters), the skew effect is not disruptive. As channel lengths increase, the propagation delay accumulates and the skew increases. Eventually, the increasing channel lengths result in bits from one word "drifting" into the bits of the next word. Once this occurs, the receiver cannot reliably align the bits into their respective words.

One attempted solution creates individual serial data bit streams out of each channel. This scheme encodes the clock signal directly into the bit stream, recovering the clock signal at the receiver and reconstructing the data word through signal processing techniques. This system requires complex signal processing at the receiver end and utilizes a valuable portion of the bandwidth of each channel encoding clock data.

Another attempted solution performs a complex set of analyses on test signal patterns on each of the channels. The tests are designed to reveal the characteristic skew of each channel. The results of the analysis are used to reconfigure compensation or filter circuits to account for the respective skew distortion in each channel. The technique is widely employed by modems. The problem with this solution, however, is that the propagation delays causing the skew are dynamic. A large number of variables affect the propagation delay of the channels (e.g., temperature, voltage, etc.) and the variables are themselves in constant flux. Hence, the tests are not accurate enough, over a long enough period of time. To compensate for this, data transmission is frequently interrupted in order to conduct these complex sets of tests. Consequently, data transmission rates suffer.

Yet another attempted solution involves merely "hand tuning" the individual wires, or fibers, of a bundle. The hand tuned wires, or fibers, are then painstakingly assembled into a data transmission cable. This scheme allows longer cables to be produced without exceeding the acceptable amount of skew for the channels, thus mitigating the problem. However, it does not address the root of the problem and can only achieve marginal improvements in distance. In addition, the resulting cables are very expensive in comparison to the benefit they confer. The costs are prohibitive with regard to the widespread adoption of this scheme.

Thus, what is desired is a method and system which overcomes the limitations of prior art parallel data transmission and reception. The desired solution should accurately and reliably compensate for skew distortion, thereby providing for the reliable parallel transmission and reception of data across much longer distances than possible with prior art technology. The desired solution should realize higher data transmission rates over a given distance than possible with prior art systems. The required system should maximize the available bandwidth of each channel. The required system should not require extensive and complex testing to characterize the propagation delay of each channel or excessively interrupt data transmission for channel testing. The present invention provides a novel solution to the above requirements.

SUMMARY OF THE INVENTION

The present invention, a method and system deskewing parallel bus channels, provides a method and system which overcomes the limitations of prior art parallel data transmission and reception. The system of the present invention accurately and reliably compensates for skew distortion, thereby providing for the reliable parallel transmission and reception of data across much longer distances than possible with prior art systems. The present invention realizes higher data transmission rates over a given distance than possible with prior art systems. Additionally, the present invention maximizes the available bandwidth of each channel and does not require extensive and complex testing to characterize propagation delay, or excessively interrupt data transmission for channel testing.

In one embodiment, the present invention comprises a dynamic skew compensation circuit, including a receiver, a plurality of channel inputs built into the receiver, and a delay stack structure coupled to the plurality of channel inputs. The receiver is adapted to accept data from a parallel data transfer cable. The channel inputs couple to each of the individual communications channels which comprise the parallel data transfer cable. The delay stack structure includes a plurality of delay stacks, each coupled to a respective communications channel. Each delay stack dynamically selects an additional delay amount for the signals received via its respective communications channel such that each communications channel of the parallel data transfer cable is deskewed with respect to the others. By deskewing the data arriving via the parallel data transfer cable, tolerances between individual bits conveyed by each communications channel can be reduced, and communications channel length can be increased.

In so doing, the distances across which data can be received and the speeds at which data is transferred via the parallel data transfer cable is increased. The available bandwidth of each communications channel is maximized without the need for extensive and complex testing to characterize each channel's propagation delay, or excessively interrupting data transmission across the cable for channel testing.

BRIEF DESCRIPTION OF THE DRAWINGS

The present invention is illustrated by way of example and not by way of limitation, in the figures of the accompanying drawings and in which like reference numerals refer to similar elements and in which.

Prior Art

Prior Art

Prior Art

DETAILED DESCRIPTION OF THE INVENTION

Figure 1:
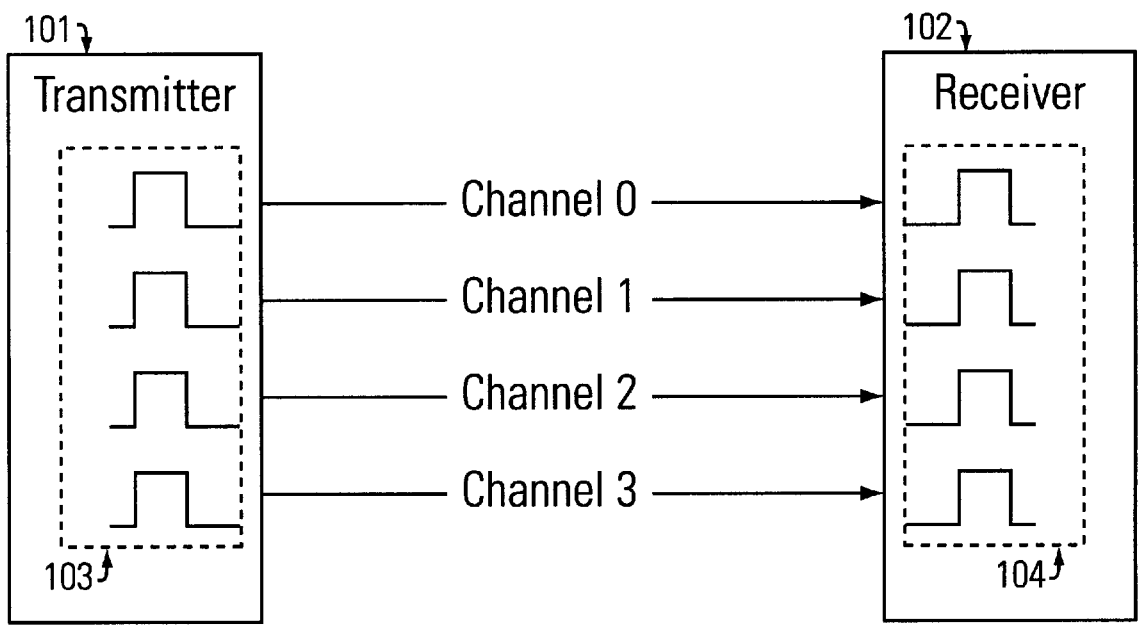
FIG. 1 shows a typical parallel data transmission system in accordance with the prior art.
Figure 2A:
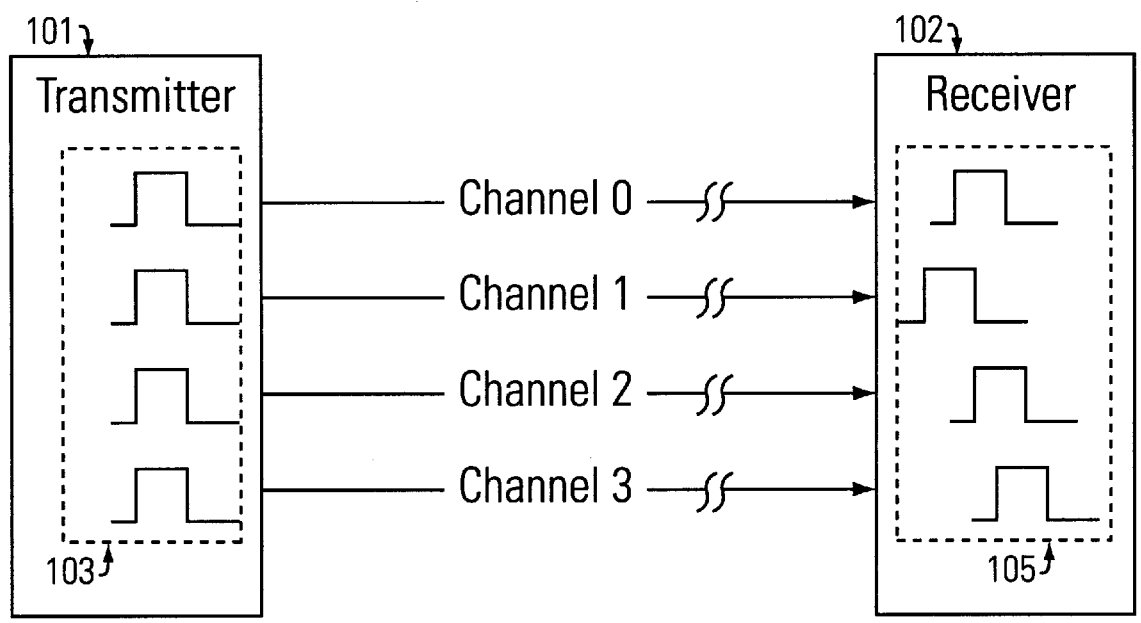
FIG. 2A shows a prior art parallel data transmission system which transmits data over longer distances.
Figure 2B:
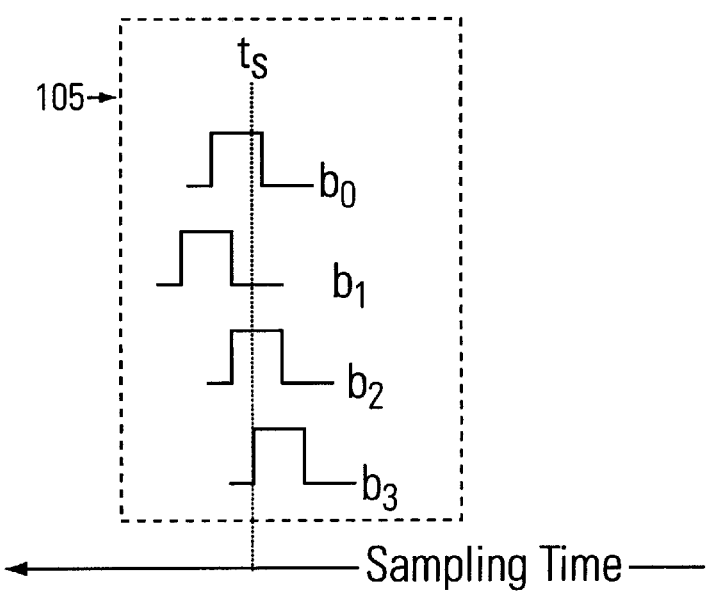
FIG. 2B shows a graph of the bits comprising a received word with respect to time, after transfer via the system from FIG. 2A.

In the following detailed description of the present invention, a method and system for deskewing parallel bus channels, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer system. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical, optical, or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "conveying" or "skewing" or "deskewing" or "sampling" or "storing" or "latching" or "selecting" or the like, refer to the action and processes of a computer system, or similar data processing device, that manipulates and transforms data represented as physical (electronic) quantities within the computer system's registers and memories into other data similarly represented as physical quantities within the computer system memories or registers or other such information storage, transmission or display devices.

The present invention, a method and system for deskewing parallel bus channels, provides a method and system which overcomes the limitations of prior art parallel data transmission and reception. The system of the present invention accurately and reliably compensates for skew distortion, thereby providing for the reliable parallel transmission and reception of data across much longer distances than possible with prior art systems. The present invention realizes higher data transmission rates over a given distance than possible with prior art systems. Additionally, the present invention maximizes the available bandwidth of each channel and does not require extensive and complex testing to characterize propagation delay, or excessively interrupt data transmission for channel testing. The present invention and its benefits are described in greater detail below.

Figure 3:
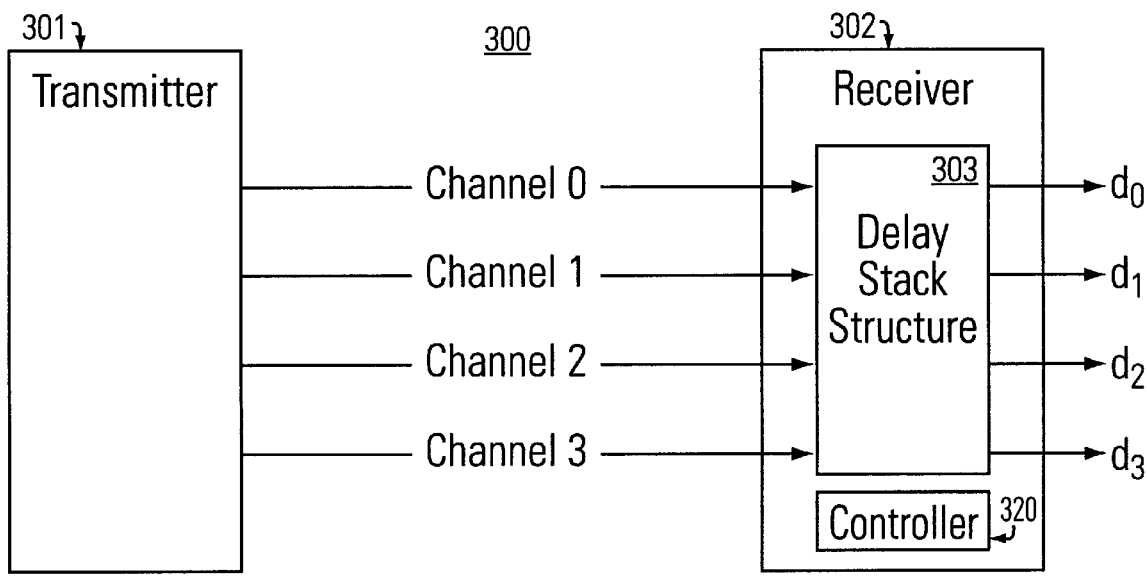
FIG. 3 shows a parallel data transmission and reception system in accordance with one embodiment of the present invention.

Referring now to FIG. 3, a parallel data transmission and reception system 300 in accordance with one embodiment of the present invention is shown. System 300 includes a transmitter 301 coupled to a receiver 302 via communications channels 0 through 3. Channels 0–3 comprise a four channel parallel data transmission cable. Receiver 302 includes a delay stack structure 303 coupled to receive signals from channels 0–3. Delay stack structure 303 generates data outputs d0 through d3. The outputs d0–d3 comprise deskewed data output channels. A controller 320 controls the operation of delay stack structure 303 and is included within receiver 302.

System 300 functions by deskewing the four bit data words conveyed by channels 0–3 as they arrive. The individual bits comprising the words are deskewed and output on d0–d3. Once deskewed, the data words are used by a coupled data processing system (not shown) in the conventional manner.

In the present embodiment, the four channels 0–3 of system 300 form a portion of a high performance parallel interface (HIPPI) data transmission system. HIPPI is a proposed ANSI (American National Standards Institute) specification for information technology. HIPPI defines a physical level, point to point, full duplex, link interface for reliable, flow-controlled, transmission of data at 6400 Mbit/sec per direction. HIPPI can be implemented over metal wires (e.g., copper) or fiber optics. A more detailed description of HIPPI is contained in "American National Standard for Information Technology—High Performance Parallel Interface—6400 Mbit/s Physical Layer (HIPPI-6400-PH)", hereinafter referred to as the HIPPI specification, and is incorporated herein as background material.

It should be appreciated that while system 300 is shown with four communications channels (e.g., channels 0–3), system 300 implements a HIPPI compliant data transfer system, thus, as is well known in the art, actually includes 22 communications channels in each direction, for a total of 44 communications channels. However, only four communications channels (e.g., channels 0–3) of system 300 are shown, as not to unnecessarily obscure aspects of the present invention.

In addition, while the present embodiment is implemented in accordance with the HIPPI specification, it should be appreciated that the method and system of the present invention is suited to use with other parallel data transmission protocols. For example, the system of the present invention can implement a small computer system interface (SCSI) data transmission and reception system, providing similar advantages over typical prior art SCSI systems. Hence, differing parallel data transfer systems in accordance with differing protocols can be implemented while remaining within the scope of the present invention.

Referring still to FIG. 3, as is well known in the art, the transmission of parallel data over long distances is affected by various factors which cause differing propagation delays of signals transmitted across the channels. These propagation delays cause the arrival times of the signals to differ from their expected, or nominal, arrival times. The individual bits comprising a word are transmitted from transmitter 301 to receiver 302. Due to the differing propagation delays, some bits of the word arrive earlier than nominal and some bits arrive later than nominal. The difference between the bit arrival times is referred to as skew.

If the skew between the individual bits of a word becomes significant, it can be difficult to accurately sample them. As described above, individual bits will appear to drift into the next word. With prior art receivers, this resulted in an error condition. To operate reliably, the prior art receiver could not be very far from the prior art transmitter (e.g., under 3 meters) or, the data rates had to be reduced in order to provide more time between arriving data words, increasing the sampling margin. However, system 300, in accordance with the present invention, actively "deskews" the channels conveying the data words, greatly increasing the range at which data can be accurately and reliably transmitted. System 300 removes the skew from the individual bits comprising each of the received data words. This allows system 300 to transmit across much longer distances than possible in the prior art (e.g., in a HIPPI 6400 implementation, 50 meters where the communications channels are copper wires, and 1 kilometer where the communications channels are fiber optic).

The system of the present invention solves the propagation delay problem of the communications channels 0–3 by electronically "padding" each channel so that the individual arrival times appear to be equal. In the present embodiment, the "padding" of each communications channel is accomplished by inserting an additional amount of delay through the use of a delay line and multiplexer (e.g., delay stack) structures. Each of the communications channels (e.g., channels 0–3) are coupled to the delay stack structure 303, where they are individually "programmed" to insert the proper amount of delay for skew compensation. The signals from the communications channels subsequently emerge from delay stack structure 303 as data outputs d0–d3. Hence, while a data word is skewed as it enters delay stack structure 303, it is deskewed as it emerges on data outputs d0–d3. The system of the present invention functions in the same manner whether the communications channels are fiber optic or metal.

Figure 4:
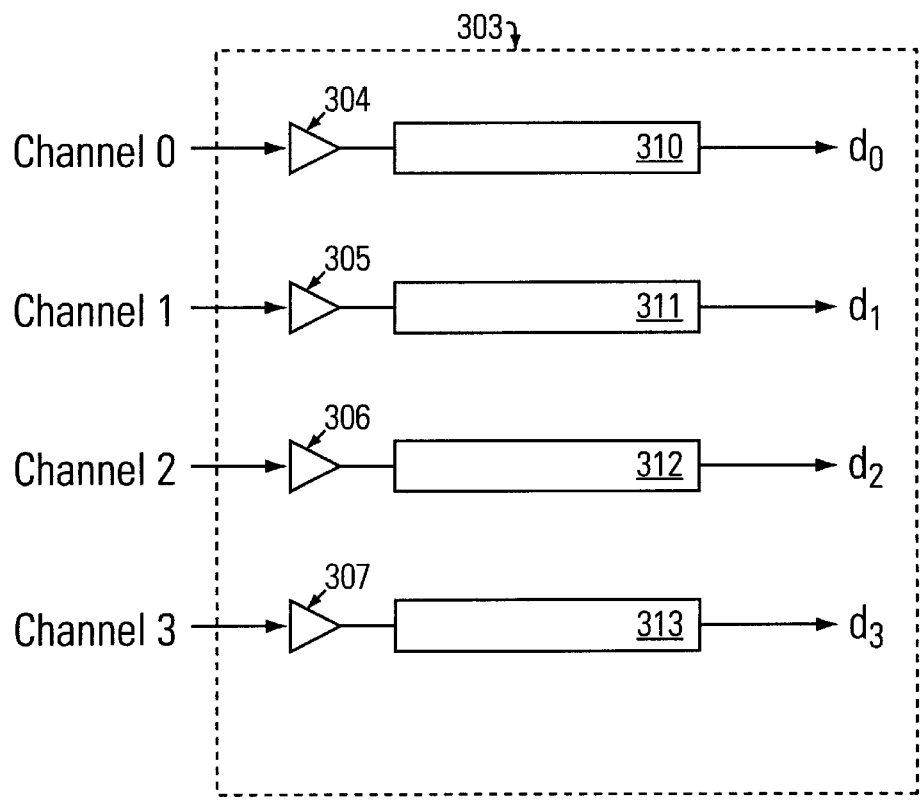
FIG. 4 shows the delay stack structure from FIG. 3 in greater detail.

Referring now to FIG. 4, the delay stack structure 303 is shown in greater detail. Communications channels 0–3 are respectively coupled to channel inputs 304 through 307. Channel inputs 304–307 are subsequently coupled to a delay line included within each of delay stacks 310 through 313. The outputs of the delay stacks 310–313 become data outputs d0–d3.

The bits of an incoming word are received at channel inputs 304–307. As described above, these bits arrive in a skewed condition. The bits are transmitted to delay stacks 310–313 via channel inputs 304–307. The delay stacks 310–313 function by adding a precise amount of delay to each bit of the word. This precise delay is such that the total amount of delay of each communications channel plus its respective delay stack for each of the bits is substantially the same. In so doing, the bits are effectively deskewed. The resulting bits of the word are output via data outputs d0–d3.

Figure 5:
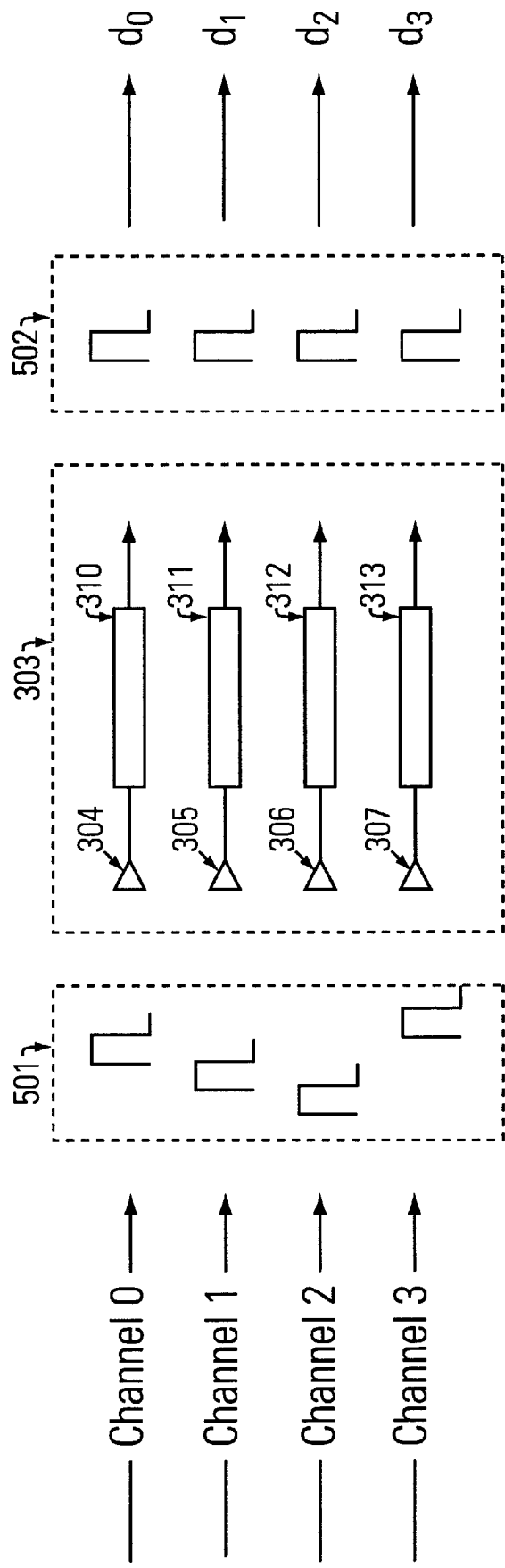
FIG. 5 shows a diagram of a deskewing operation in accordance with the present invention.

FIG. 5 shows a diagram of the deskewing operation. Delay stack structure 303 receives an incoming word 501 (e.g., 1111). The bits of word 501 are skewed. This distortion is generally referred to as skew, and is represented in FIG. 5 by the different arrival times of the bits of word 501. The skew, as discussed above, leads to difficulty in accurate sampling. The system of the present invention, however, removes the skew prior to sampling. Delay stack structure 303 deskews the bits and outputs word 502 via outputs d0–d3. Hence, while the bits of word 501 were not synchronous upon arrival from transmitter 301, they emerge synchronously from outputs d0–d3 as word 502. Word 501 is deskewed by delay stack structure 303 and word 502 is output without skew distortion.

Figure 6:
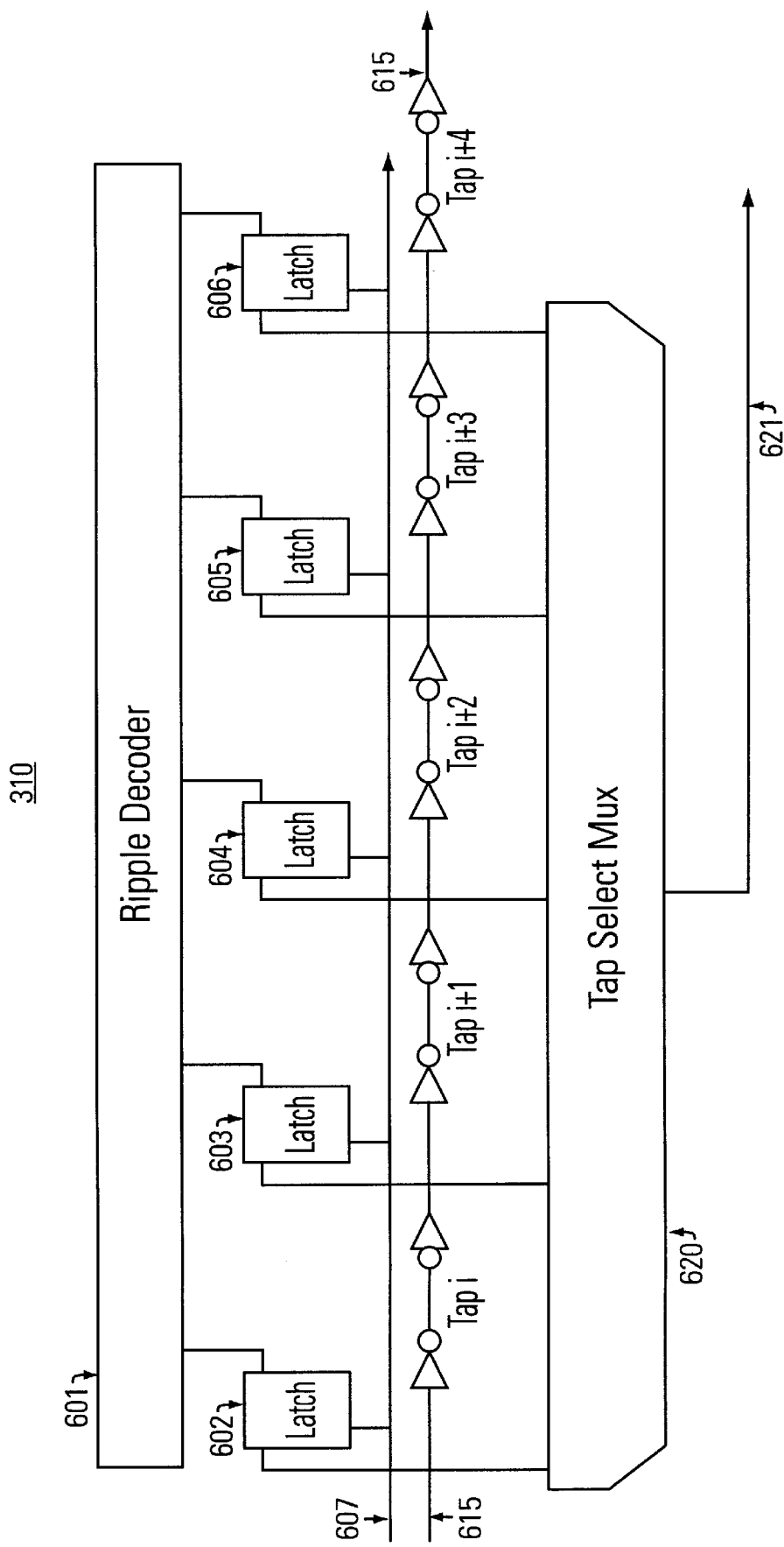
FIG. 6 shows a delay stack in accordance with one embodiment of the present invention.

Referring now to FIG. 6, a delay stack 310 in accordance with one embodiment of the present invention is shown. Delay stack 310 is one of delay stacks 310–313 in delay stack structure 303 (from in FIG. 5). Delay stack 310 includes a ripple decoder 601, a plurality of latches 602–606, a delay line 615, and a tap select multiplexer 620.

As described above, delay stack 310 functions by adding an additional amount of delay to a signal received from channel input 304 such that output d0 is deskewed with respect to the other outputs. Delay line 615 is coupled to channel input 304 to receive signals from channel 0. Delay line 615 is includes a series of "taps". In the present embodiment, each tap is comprised of two back to back inverters and is numbered tap i, through tap i+1, tap i+2, and so on, for a total of N taps.

The inverters comprising each tap are precisely fabricated to be as close a copy as possible to each other inverter, and thus, provide the same amount of delay. Accordingly, each tap (e.g., tap i) provides the same amount of delay as another tap (e.g., tap i+1) within delay line 615. The signal from channel input 304 is coupled to delay line 615 on the left of FIG. 6 and is conducted through the taps, toward the right. Each tap adds its precise amount of delay. Hence, the proper amount of delay is added by selecting the proper tap output.

For example, where three tap delays are required to deskew channel 0, the tap select multiplexer 620 selects tap i+2. Tap select multiplexer implements a signal path from channel input 304 to the output of tap i+2, to output line 621. As the signal from channel 0 proceeds through delay line 615, it is routed from the output of tap i+2 to output line 621 to become output d0. In this manner, delay line 615 and tap select multiplexer 620 can add variable amounts of delay such that as the skew of channel 0 varies, output d0 is continually deskewed.

The total amount of delay which can be added is determined by the delay of a single tap and the number of taps included in delay line 615. Although FIG. 6 only shows taps i through i+4, it should be appreciated that delay line 615 includes N number of taps, where N encompasses the longest skew delay line 615 is likely to see. In addition, it should be noted that delay is added incrementally, with a granularity equal to the delay of each additional tap.

Thus, the amount of delay which can be added is variable such that delay stack 310 can continually compensate for the variable skew on input channel 0. To determine the amount of delay to add, delay stack 310 periodically measures the amount of skew present. This is accomplished through the use of a special "ping" sequence.

During normal operation, (e.g., in a HIPPI implementation of the present invention) receiver 302 processes normal data comprised of micropackets. A micropacket is the basic transfer unit from a HIPPI compliant transmitter (e.g., source) to a HIPPI compliant receiver (e.g., destination). A "normal" micropacket is typically comprised of 32 data bytes and 64 bits of control information. At 6400 Mbit/sec, a normal micropacket is transmitted every 40 ns. Hence, during normal operation, the traffic conveyed by delay stack structure 303, and therefore delay stack 310, are the data words comprising the normal micropackets. Periodically, however, a training micropacket is sent to enable delay stacks 310–315 to recharacterize the skew of their respective channels. Each training micropacket includes the special ping sequence. The propagation of this ping sequence through each of the delay stacks 310–315 is utilized by the present invention to determine the relative skew for each channel, and hence, the proper amount of delay to add.

The ping sequence is transmitted from transmitter 301 via channels 0–3 to receiver 302 and each of delay stacks 310–315. In delay stack 310, the ping sequence is coupled to delay line 615 from channel input 304. The ping sequence subsequently "propagates" through delay line 615, through each successive tap. Correspondingly, the ping sequence also propagates through each other delay stack (e.g., delay stacks 311–313) in the same manner. Due to the skew present in channels 0–4 however, the ping sequence arrives at some delay stacks prior to others. Accordingly, the ping sequence propagates further through the delay lines of the delay stacks first entered than through those last entered. The controller 320, by precisely timing the opening and the closing of the latches coupled to their respective delay lines, uses each of delay stacks 310–313 to determine how far the ping sequence propagates through their respective delay lines, and thus, determine the skew of their respective channels.

In delay stack 310, for example, just prior to the arrival of the ping sequence, controller 320 opens latches 602–606 via control line 607. Subsequently, as the ping sequence propagates through each successive tap, its passing is registered in the latches 602–606 coupled to the outputs of each respective tap. As the ping sequence passes from the output of tap i to tap i+1, latch 603 registers its passing. As the ping passes from tap 1+1 to tap i+2, latch 604 registers its passing, and so on. Once the ping sequence on the slowest of channels 0–3 has entered its respective delay line, controller 320 generates an All_Present signal, which closes the latches 602–606 of each of delay stacks 310–313. Consequently, when All_Present asserts, the latches take a snap shot of the instant contents of all the delay lines and saves this information for later use.

In this manner, in delay stack 310, latches 602–606 store the progress of the ping sequence as it rippled down delay line 615 (and likewise in the delay lines of delay stacks 311–313). Those taps through which the ping sequence passed have a logical one stored in their respective latches, while those taps not reached by the ping sequence prior to the All_Present signal have a logical zero stored in their latches. The outputs of the latches 602–606 are coupled to ripple decoder 601. Ripple decoder 601 analyzes each of the outputs to determine the progress of the ping sequence. The furthest tap through which the ping sequence rippled indicates the particular tap output to select in tap select multiplexer 620, which, in turn, controls the amount of delay to be added to channel 0.

For example, where latch 604 was the last latch to register the ping sequence (e.g., by storing a logical one), ripple decoder 601 selects the output of tap i+2 in tap select multiplexer 620, thus coupling the output of tap i+2 to output line 621 and selecting the proper amount of delay to add to channel 0. For example, in the present embodiment, as ripple select decoder 601 analyzes the contents of the latches, it selects the tap corresponding to the first 0 from beginning of delay line 621 (as opposed to the last 1). The output of this tap is coupled to d0. In this manner, each of delay stacks 310–313 select their respective amount of delay to add to their respective channels. Hence, when the training sequence is complete and system 300 proceeds to normal operation, the signals of channel 0 proceed through delay line 615, through tap i+2, and out through output line 621.

In this manner, each of delay stacks 310–313 add their respective amount of delay. Thus, the data words emerging from delay stack 303 are deskewed (e.g., word 502). Each successive normal micropacket (e.g., each data word) is received, deskewed, and output. Each of delay stacks 310–313 compensate for skew in their respective communications channels. The tap select multiplexers within each of the delay stacks 310–313 form variable signal paths from their channel inputs to their data outputs, the signal paths varying to include the number of taps necessary to yield the proper amount of delay for their respective communications channels. In so doing, system 300 accurately and reliably compensates for skew distortion, thereby providing for the reliable parallel transmission and reception of data across much longer distances than possible with prior art systems.

It should be appreciated that while in the present embodiment, each tap (e.g., tap i) is comprised of a pair of inverters, the system of the present invention is suited to the use of taps comprised of other delay elements. The taps of the present invention, for example, could be comprised of OR gates. Inverters were selected due to their delay characteristics, compact size, and ease of fabrication. However, different delay elements can be utilized while remaining within the scope of the present invention.

Figure 7:
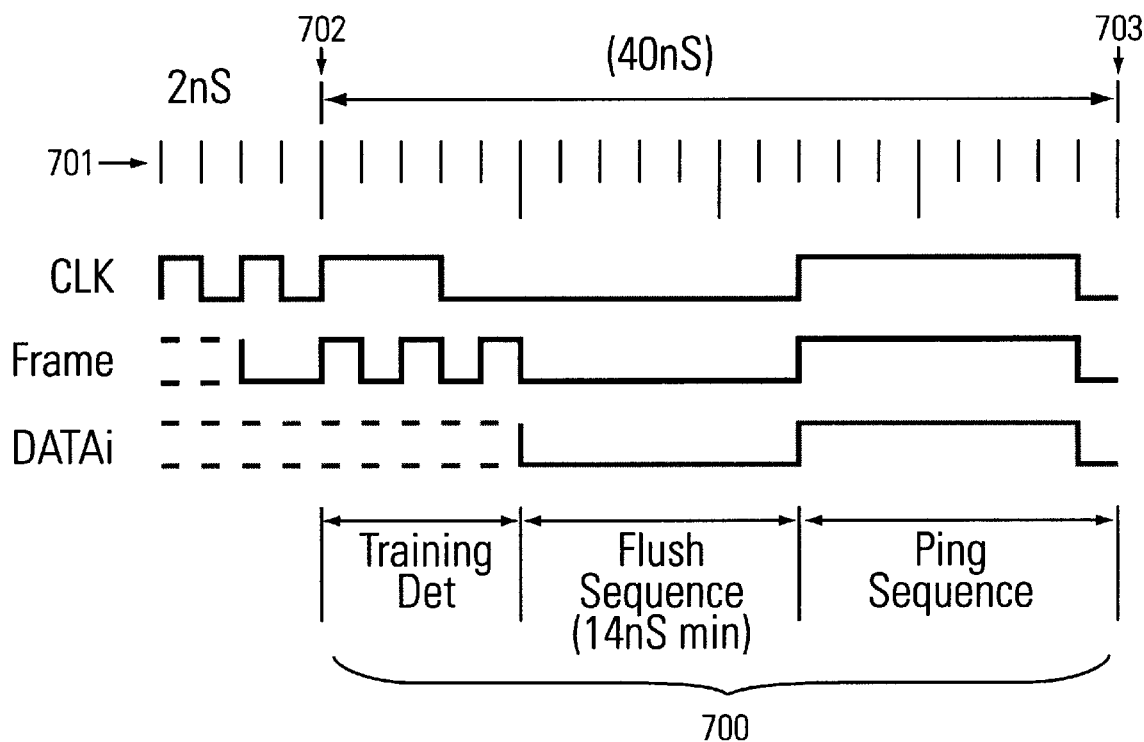
FIG. 7 shows a training micropacket in accordance with one embodiment of the present invention.

With reference now to FIG. 7, a training micropacket 700 (e.g., at transmitter 301 from FIG. 3) in accordance with one embodiment of the present invention is shown. Training micropacket 700 is shown with respect to a time line 701. In accordance with the HIPPI specification, training micropacket 700 is 40 ns long, extending from time 702 to time 703. Training micropacket 700 includes a training detection sequence, a flush sequence, and a ping sequence. The signals CLK, Frame, and DATA i (one of 20 parallel data signals) are shown.

As described above, during normal operation, normal micropackets in accordance with the HIPPI specification are transmitted from transmitter 301 to receiver 302. The data words comprising the micropackets are deskewed in accordance with the system of the present invention. As the skew present in the communications channels varies over time, the system of the present invention periodically "retrains" each of delay stacks 310–313 through the use of training micropackets (e.g., training micropacket 700) in the manner described above. The time period where a training micropacket (e.g., training micropacket 700) is received and processed is referred to as a training period.

The training detect sequence of training micropacket 700 functions by alerting controller 320 that the present micropacket is a training micropacket and that the present 40 ns period is a training period, thus preparing system 300 for retraining. In normal micropackets, in accordance with the HIPPI specification, the Frame signal is high for the first 20 ns of the period and low for the last 20 ns, while the CLK signal alternates every 2 ns. During the first portion of the training micropacket, however, CLK is driven high for 6 ns and then driven low, while Frame is alternately driven high and low every 2 ns. This alerts controller 320 to the fact that the present micropacket is a training micropacket. In response, the latches of the respective delay stacks 310–313 are opened by controller 320 in preparation for the ping sequence.

Preceding the ping sequence is the flush sequence. In the present embodiment, the flush sequence is 14 ns long, and functions by flushing the delay lines of the respective delay stacks 310–313 with logical zeros in preparation for the ping sequence. The last portion of training micropacket 700 is itself the ping sequence, where all the channels 0–3 are driven high, sending logical ones down each of the channels 0–3 and into each respective delay stack 310–313. The "edge" of the ping sequence is synchronous in time across each of the channels (e.g., at the transmitter 301 end). Prior to the end of the ping sequence, each of channels 0–3 are driven low in preparation for the next micropacket.

Figure 8:
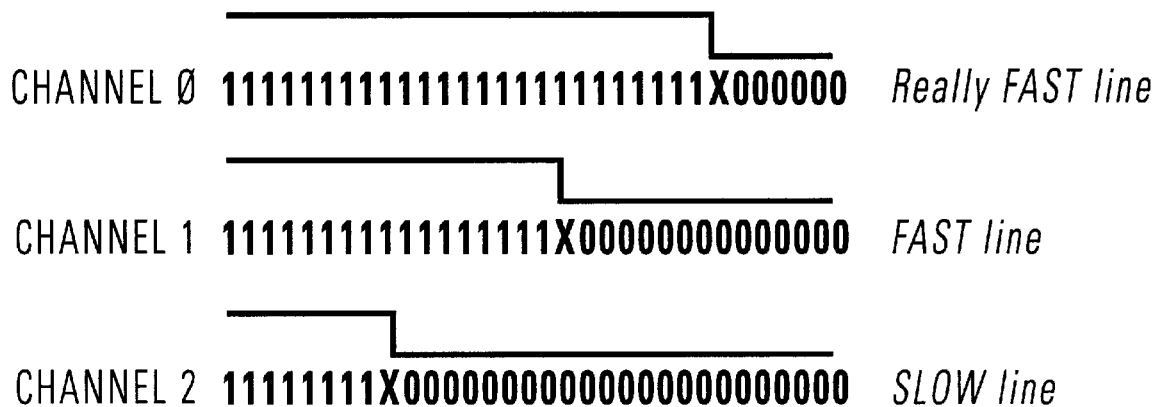
FIG. 8 shows a diagram illustrating the progress of a ping sequence through each of the delay lines of one embodiment of the present invention, with respect to the output of their respective latches.

Referring now to FIG. 8, a diagram 800 is shown representing the progress of the flush sequence and the ping sequence through each of the delay lines (e.g., delay line 615 of delay stacks 310, 311, and 312, corresponding to channels 0, 1, and 2. The output of the respective latches for channels 0, 1, and 2 are shown. A "1" indicates that particular latch registers a logical one, indicating the ping sequence has rippled past its input, while a "0" indicates the ping sequence has not yet reached that particular latch. An "X" means the output is indeterminate, as that particular latch is in the process of changing from a "0" to a "1".

Hence, diagram 800 shows that channel 0 is a particularly fast channel. The ping sequence has propagated further down its respective delay line than the other channels. Hence, channel 0 has the largest amount of additional delay added. Channel 1 is slower than channel 0 but faster than channel 2. Its additional delay is sized accordingly. Channel 2 is a particularly slow channel. It is the last channel to receive the ping sequence, and therefore, shows the shortest length of propagation. Accordingly, its added amount of additional delay is the smallest. In addition, the arrival of the ping sequence in channel 2, the last channel to receive it, leads to the subsequent assertion of the all present signal by controller 320. As described above, this signal closes all the latches, resulting in a "snapshot" of the relative skew of the channels, as shown in diagram 800. The latches, at the time the all present signal is asserted, save the state of their respective delay lines. The system of the present invention, in the manner described above, uses the information stored in the latches to configure each of the multiplexers in each of the delay stacks 310–313.

Thus, as shown by diagram 800, it is important that each of the delay lines is long enough (e.g., includes a large enough number of taps and their respective latches) so that the leading edge of the ping sequence for the fastest channel (e.g., channel 0) is still within its delay line when the leading edge of the ping sequence arrives at the slowest channel (e.g., channel 2). Hence, in the present embodiment, the system of the present invention includes delay lines having 160 taps.

Figure 9:
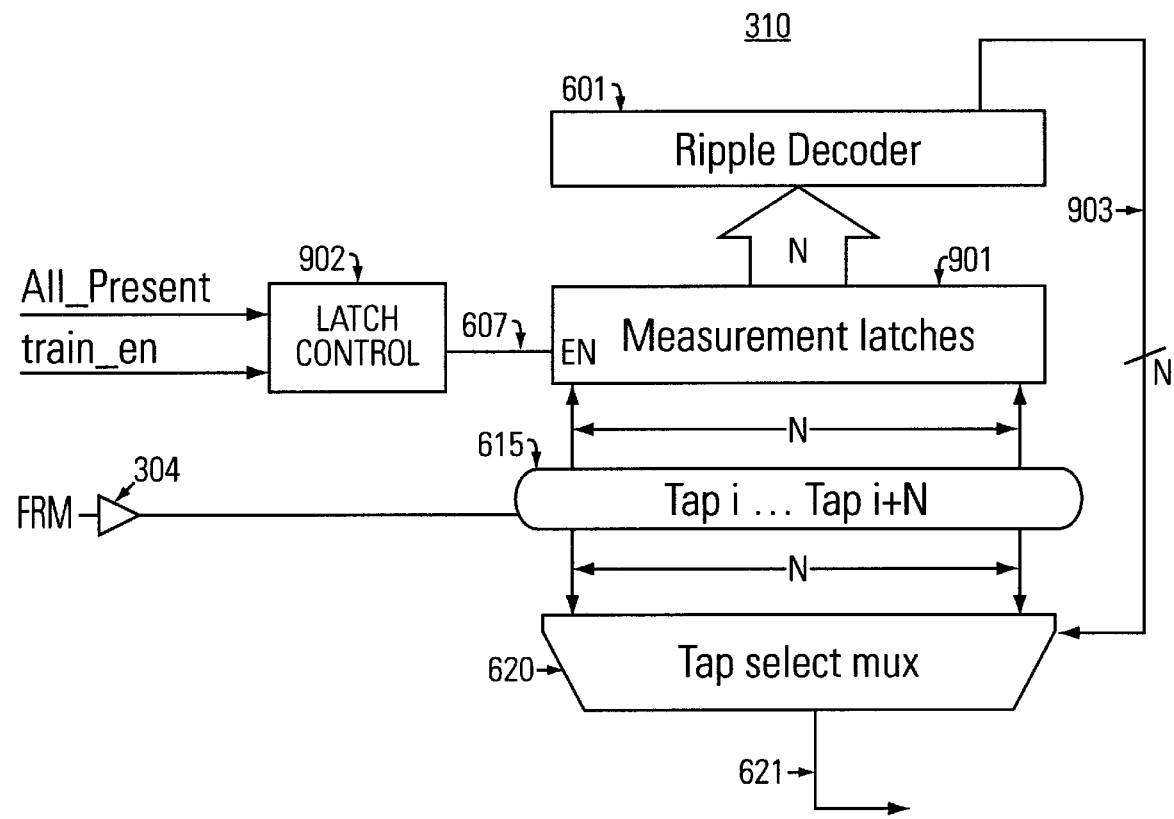
FIG. 9 shows a delay stack in accordance with one embodiment of the present invention in greater detail.

With reference now to FIG. 9, a delay stack 310 in accordance with one embodiment of the present invention is shown in greater detail. The measurement latches from FIG. 6 (e.g., latches 602–606) are contained within measurement latches 901. Measurement latches 901 contain N number of latches corresponding to N number of taps in delay line 615. The measurement latches 901 are coupled to ripple decoder 601 via N lines. In the present embodiment, 160 taps are included in each delay line (hence, N equals 160). A latch control circuit 902 controls the opening and closing of measurement latches 901 through latch enable line 607. Latch control circuit 902 accepts as inputs the all present signal and a train enable signal train_en from controller 320. The ripple decoder 601 controls the tap select multiplexer via control lines 903.

Figure 10:
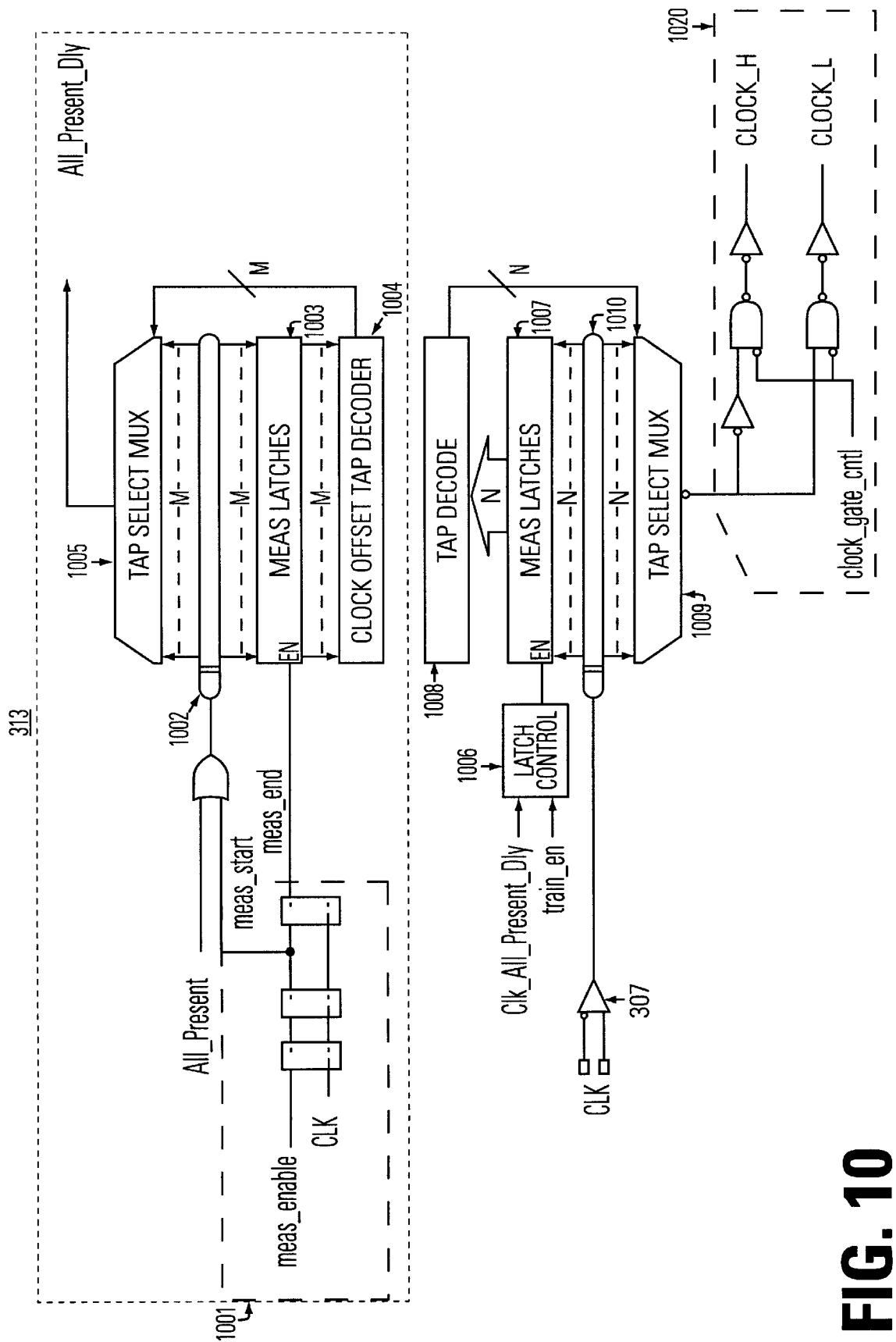
FIG. 10 shows a delay stack for the communications channel which conveys the clock signal, in accordance with one embodiment of the present invention.

Referring now to FIG. 10, a delay stack 313, for the clock signal, in accordance with one embodiment of the present invention is shown. Delay stack 313, and hence, channel 3, convey the clock signal CLK for system 300. The clock signal, in accordance with the HIPPI specification, is transmitted across one of the communications channels (channel 3 in the present example) and is used in sampling the data on the rest of the communications channels. However, the clock signal, as is each of the other signals, is skewed. The clock signal could be processed along with the rest of the signals in delay stack structure 303, such that their respective rising edges are skew compensated. This would not be desired due to the fact that the other signals (e.g., DATA) conveyed by the communications channels are sampled with respect to both edges of the clock signal. Lining the edges of the clock signal up with the edges of the other signals makes them sample indeterminately. Thus, the system of the present invention adds an additional amount of delay to the clock signal such that it lines up correctly with respect to the other signals. This feature is referred to as clock edge placement.

To implement the first step of clock edge placement, delay stack 313 measures the clock period. Clock period measurement is performed by logic circuit 1001. At the start of the clock period, logic circuit 1001 sends a measurement start signal meas_start down a delay line 1002. At the end of the clock period, logic circuit 1001 sends a measurement end signal meas_end to the measurement latches 1003, causing them to close, taking a snapshot of the measurement start signal as it propagates down delay line 1002.

To implement the second step of clock edge placement, a clock offset tap decoder 1004, then divides the measured clock period by four. The divide by four result is desired due to the fact that both the rising edge and the falling edge of the clock signal is used to sample data. As such, an additional ¼ clock period of delay is required. Measurement latches 1003 now contain the snapshot of the meas_start signal as it propagated down delay line 1002. This snap shot represents the delay of one complete cycle of the clock signal CLK. Thus, to divide the clock signal by four, clock offset tap decoder 1004 examines every fourth tap to select a delay amount equal to ¼ clock period. The clock offset tap decoder configures a multiplexer 1005 accordingly to generate the signal All_Present_Dly.

To implement the last step of clock edge placement, delay stack 313 uses the All_Present_Dly signal to inject an additional delay equal to ¼ clock period into the delay line 1010. Whereas the other delay stacks (e.g., delay stack 310) used the All_Present signal to close their latches, delay stack 313 uses the All_Present_Dly signal via latch control circuit 1006 to close measurement latches 1007. Thus, at a precise time, ¼ clock period later than the other delay stacks, measurement latches 1007 closes. This takes a snapshot of the skew present in channel 3 (e.g., the clock signal) as the ping sequence propagates down delay line 1010 plus precisely ¼ clock period more time. A tap decoder 1008 uses this information to configure a multiplexer 1009 to select precisely the amount of delay for channel 3, thus implementing proper clock edge placement.

Delay stack 313 also includes a clock gate control circuit 1020. Clock gate control circuit 1020 functions by preventing data from the training sequence from passing through to other circuits. Clock gate control circuit 1020 receives as an input a clock_gate_cntl signal from controller 320. The outputs of clock gate control circuit 1020 are CLOCK_H and CLOCK_L, which are clock signals of opposite phase. When the training period is complete, the clock_gate_cntl signal is deasserted, enabling the CLOCK_H and CLOCK_L outputs.

Figure 11:
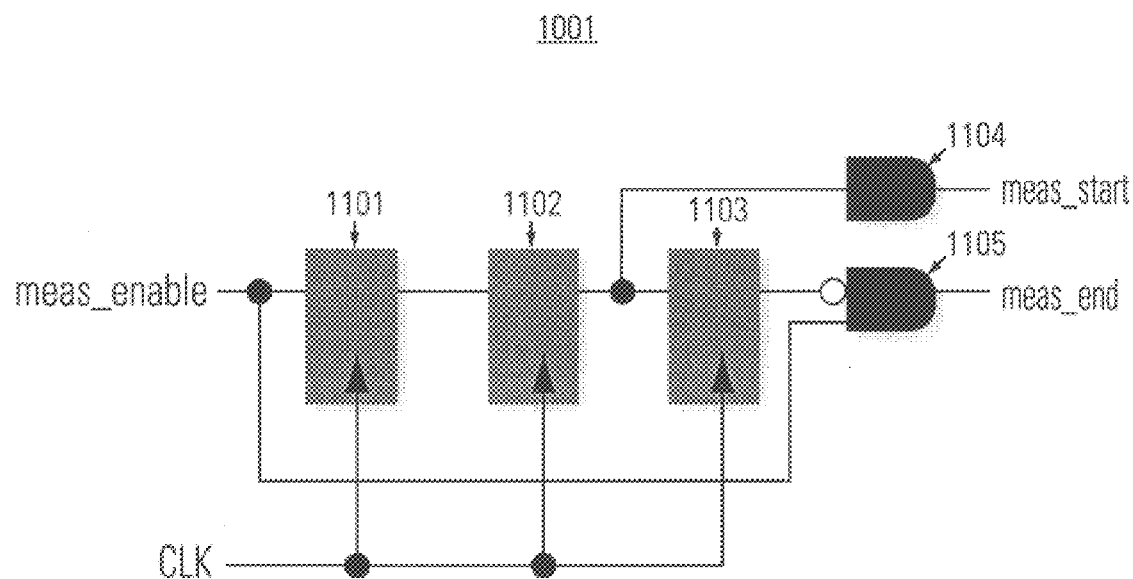
FIG. 11 shows a logic circuit for measuring the period of the clock signal, in accordance with one embodiment of the present invention.

FIG. 11 shows the logic circuit 1001 in accordance with one embodiment of the present invention in greater detail. Logic circuit 1001 includes a flip flop 1101, a flip flop 1102, and a flip flop 1103. flip flop 1101 accepts a meas_enable signal from controller 320 as an input and has its output coupled to the input of flip flop 1102. The output of flip flop 1102 is coupled to an AND gate 1104. The output of flip flop 1103 is inverted and coupled to an AND gate 1105. AND gate 1105 also accepts the meas_enable signal from controller 320 as an input. AND gate 1104 is included within logic circuit 1001 to balance the timing of meas_start with meas_end.

Figure 12:
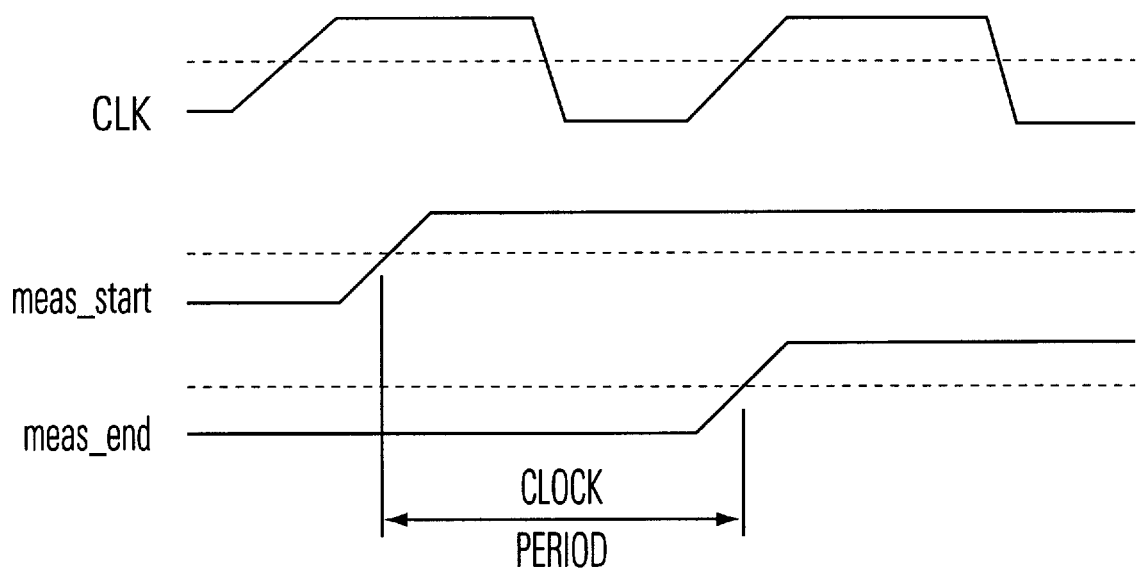
FIG. 12 shows a timing diagram illustrating the operation of the logic circuit from FIG. 11.

FIG. 12 shows a timing diagram 1200 illustrating the operation of logic circuit 1001. The rise and fall times of the signal CLK have been exaggerated to show the benefit of measuring a full clock cycle. The first two flip flops, 1001 and 1102 function by synchronizing the meas_enable signal to the CLK signal to generate the meas_start signal. This signal is coupled to delay line 1002. The meas_start signal propagates down the delay line until the very next rising edge of CLK, which generates the meas_end signal. This closes the latches, storing the state of the delay line 1002 at that instant. In this manner, logic circuit 1001 measures the period of CLK.

It should be appreciated that in order for logic circuit 1001 and delay line 1002 to measure the clock period CLK, receiver 302 needs to be receiving normal micropackets. As described above, during a training micropacket, the channels are alternating (e.g., a flush sequence followed by a ping sequence). Thus, the clock period cannot be measured during the training micropackets. Hence, delay stack 313 includes two delay lines, delay line 1002 and delay line 1010. During normal operation, delay line 1002, in conjunction with logic circuit 1001, measures the period of CLK and determines the proper ¼ clock delay. Meanwhile, delay line 1010 handles the normal skew compensation of the CLK signal on channel 3. During training periods, however, delay line 1010 determines the proper amount of skew compensation for channel 3 and, through the ¼ clock delay of All_Present_Dly, adds the additional ¼ clock period for clock edge placement. Hence, during normal operation, delay line 1002 is used to measure the CLK period and during training periods delay line 1002 is used to inject the ¼ clock period delay into delay line 1010.

In addition, it should be appreciated that upon system 300 power up, before meaningful data can be transmitted and received, receiver 302 needs to receive a normal micropacket in order to properly perform clock edge placement. Once the clock period has been measured and the clock edge placed, the receiver can train each of delay stacks 310–313 for proper skew compensation. Consequently, at system 300 power up, transmitter 301 sends normal micropackets alternating with training micropackets until receiver 302 is properly trained and is ready for normal operation.

Figure 13:
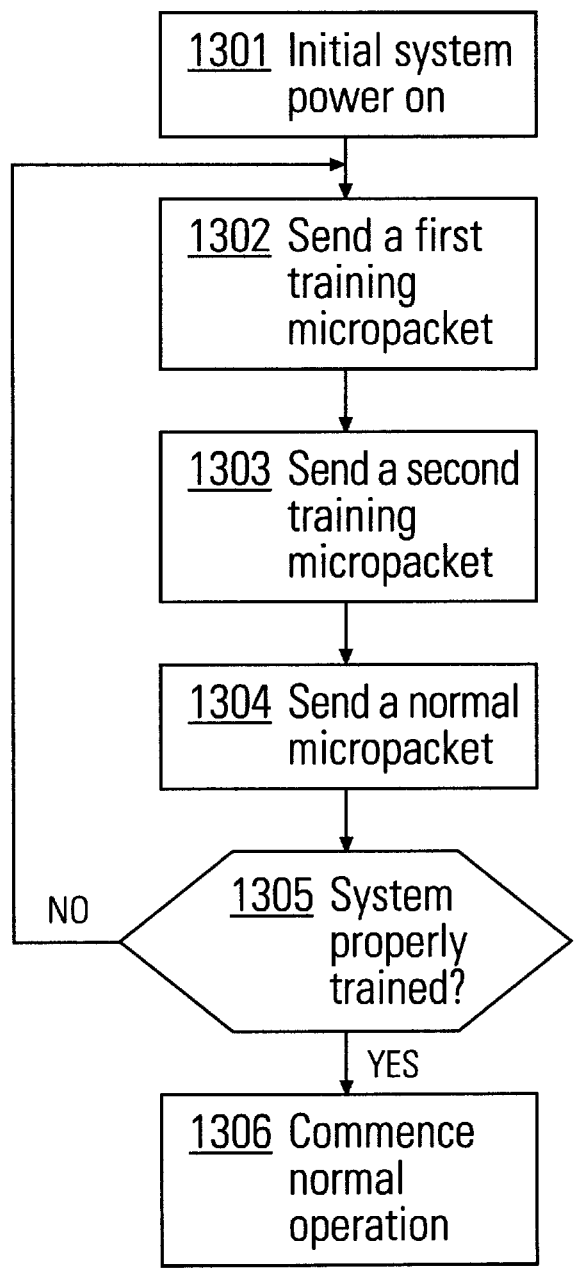
FIG. 13 shows a flow chart of the steps of a process in accordance with one embodiment of the present invention.

With reference now to FIG. 13, a flow chart of the steps of a process 1300 in accordance with one embodiment of the present invention is shown. Process 1300 illustrates steps a system in accordance with a HIPPI implementation of the present invention (e.g., system 300 from FIG. 3) proceeds through from initial power on to normal operation. As such, processes in accordance with different implementations may include different steps, yet still remain within the scope of the present invention.

Process 1300 begins in step 1301, where the system of the present invention initially powers up. At initial power up, the delay compensation in the delay stack structure (e.g., delay stack structure 303) is not adjusted. Accordingly, no meaningful data can be transmitted or received until the system characterizes the delay on the various communications channels (e.g., channels 0–3).

In step 1302, the transmitter (e.g., transmitter 301) sends a training micropacket as part of an initial training sequence. As described above, the training micropacket includes a training detect sequence, a flush sequence, and a ping sequence. Each delay stack (e.g., delay stack 310) of the delay stack structure measures the propagation of the ping sequence down their respective delay lines (e.g., delay line 615 from FIG. 6). As the ping sequence propagates down the delay lines, latches within each delay stack record its progress. Once the ping sequence has reached all the delay lines (e.g., the ping sequence having propagated through the slowest channel) a controller (e.g., controller 320) generates an All_Present signal which closes the latches of each of the delay stacks. As described above, each delay stack uses the information stored in the latches to deskew its respective channel.

In step 1303, the transmitter sends another training micropacket to retrain each of the delay stacks. This second training micropacket is sent immediately after the first training micropacket sent in step 1302. This allows the system of the present invention to readjust the compensation in each delay stack, in case of error. As described above, however, in order to complete the training process, the transmitter needs to send a normal (i.e., non-training) micropacket having a normal clock signal (e.g., CLK).

In step 1304, the transmitter sends a normal micropacket to the receiver. This normal micropacket, as described above, has a normal clock signal. Thus, the delay stack coupled to the channel conveying the clock signal (e.g., channel 3) utilizes a logic circuit (e.g., logic circuit 1001 from FIG. 10) to measure the period of the clock signal. This period is subsequently used to inject an additional amount of delay into the channel's delay line (e.g., delay line 1010) in order to accomplish clock edge placement. Clock edge placement, as described above, results in the edges of the clock signal being placed such that the deskewed data emerging from the outputs (e.g., outputs d0–d3) of the receiver can be sampled synchronous with the clock signal's rising and falling edges.

In step 1305, the system of the present invention determines whether it has been properly trained. For proper training, the skew compensation should have been correctly set in steps 1302 and 1303, and the clock period should be correctly measured for clock edge placement in step 1304. The system detects whether the skew compensation is correct and whether the clock edge placement is correct. If not, process 1300 loops back to step 1302. If the system is properly trained, process 1300 proceeds to step 1306. Hence, the system continually sends a series of two training micropackets followed by a normal micropacket until proper training is accomplished.

In step 1306, the system of the present invention commences normal operation. The delay stacks (e.g., delay stacks 310–313) deskew the incoming data words of the normal micropackets (e.g., data word 501 from FIG. 5), producing deskewed data words (e.g., data word 502). The normal data words are transmitted and received at the rate of 1 every 2 ns, yielding a data throughput of 500 Mbit/sec per channel.

It should be appreciated that during normal operation, the system of the present invention periodically retrains itself to adjust for skew components which vary with time. In one embodiment, for example, a programmable retraining timer periodically sends training micropackets to adjust for skew at programmable intervals. Between the intervals of the retraining timer, normal micropackets are transmitted. In addition, a retraining micropacket is sent when a transmission error is detected.

Figure 14:
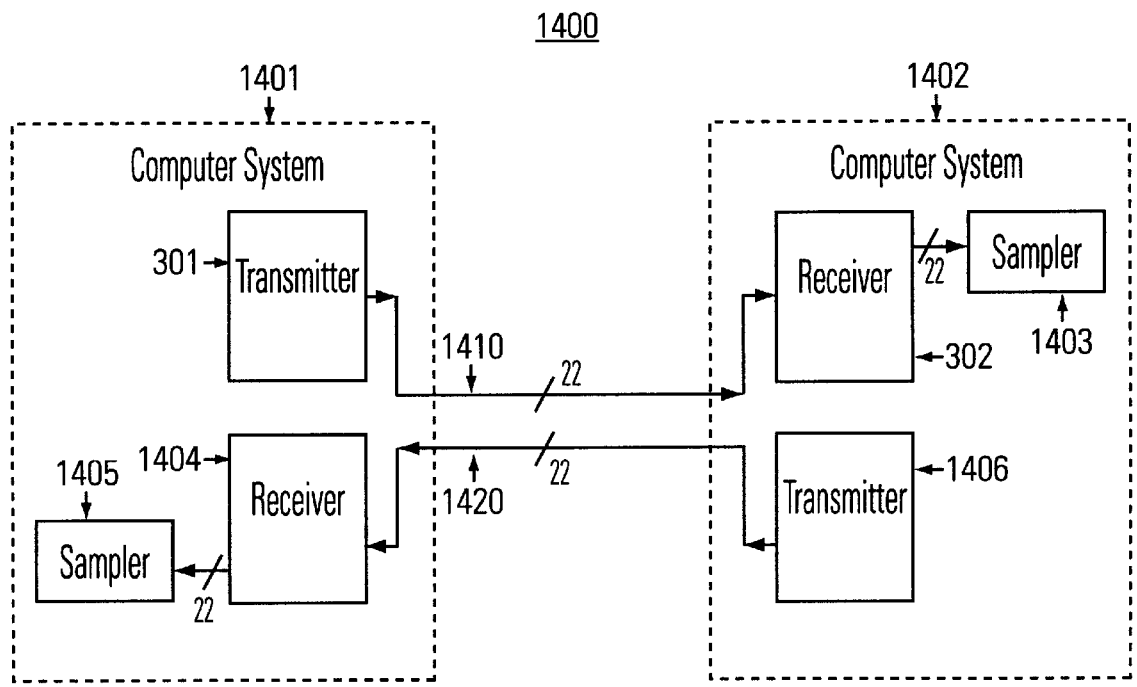
FIG. 14 shows a diagram of a 20 bit data communications system in accordance with one embodiment of the present invention.

Referring now to FIG. 14, a 16 bit HIPPI data communications system 1400 in accordance with one embodiment of the present invention is shown. System 1400 includes a computer system 1401 and a computer system 1402. Computer system 1401 includes the transmitter 301, a receiver 1404, and a sampler 1405. Computer system 1402 includes the receiver 302, a sampler 1403 and the transmitter 1406. As described above, transmitter 301 and receiver 302 comprise one direction of data transfer. Transmitter 1406 and receiver 1404 comprise the opposite direction of data transfer. Data is transmitted from computer system 1401 to computer system 1402 via the 22 communications channels of wires 1410. Similarly, data is transferred from computer system 1402 to computer system 1401 via the 22 communications channels of wires 1420. The wires 1410 and wires 1420 together comprise a HIPPI parallel data transfer cable, each communications channel being a shielded copper wire pair.

Receiver 302, as described above, deskews data words received via wires 1410. The resulting deskewed data words are subsequently coupled to sampler 1403 where they are sampled and interfaced to the internal busses of computer system 1402. In the present embodiment, receiver 1404 and transmitter 1406 are the same as receiver 302 and transmitter 301, except for the fact that data transfer is in the opposite direction. Sampler 1405, in the same manner as sampler 1403, samples the deskewed data words from receiver 1404 and interfaces them with the internal busses of computer system 1401. Thus, system 1400 provides for full duplex, deskewed, reliable data transfer at 6400 Mbit/sec in each direction, at distances of up to 50 meters (e.g., in the present embodiment, a HIPPI 6400 implementation).

Thus, the present invention, a method and system for deskewing parallel bus channels, provides a method and system which overcomes the limitations of prior art parallel data transmission and reception. The system of the present invention accurately and reliably compensates for skew distortion, thereby providing for the reliable parallel transmission and reception of data across much longer distances than possible with prior art systems. The present invention realizes higher data transmission rates over a given distance than possible with prior art systems. Additionally, the present invention maximizes the available bandwidth of each channel and does not require extensive and complex testing to characterize propagation delay, or excessively interrupt data transmission for channel testing.

The following is an exemplary verilog embodiment of a controller (e.g., controller 320) in accordance with one HIPPI implimentation of the present invention:

```
// $Id: dsc_cntl.v/main/18 1997/06/26 18:13:45 GMT
module dsc_cntl (CLK_500MHZ_H
        ,CLK_500MHZ_L
        ,SUMAC_RESET_L
        ,SIM_RESET_L
        ,DSC_ENB
        ,AC_WIDTH16
        ,CLK_IN
        ,CLK_OUT
        ,ALL_PRESENT
        ,SCAN_GATE
        ,LSSD_A
        ,LSSD_B
        ,LSSD_C
        ,LSSD_SI
        ,TRAIN_ENB
        ,TRAIN_ENB_DLY
        ,ENB_CLK_OUT
        ,NORM_UPKT
        ,MEAS_CLK_PER_8B
        ,MEAS_CLK_PER_16B
        ,LSSD_SO
        );
    input   CLK_500MHZ_H;       // 500MHz clock
    input   CLK_500MHZ_L;       // Active-low version of CLK_500MHZ_H
    input   SLMAC_RESET_L;      // Power-on reset
    input   SIM_RESET_L;        // Simulation reset
    input   DSC_ENB;            // Enable deskew logic
    input   AC_WIDTH16;         // 8/16 bit mode of operation (0/1)
    input   CLK_IN;             // HiPPI clock input
    input   CLK_OUT;            // Ungated DSC clock output to the SSR
    input   ALL_PRESENT;        // Ping pulse seen at all channels
    input   SCAN_GATE;          // Testability input
```

-continued

```
input     LSSD_A;              // Testability input
input     LSSD_B;              // Testability input
input     LSSD_C;              // Testability input
input     LSSD_SI;             // Testability input
output    TRAIN_ENB;           // Training micro-packet detected
output    TRAIN_ENB_DLY;       // TRAIN_ENB delayed by 2nS
output    ENB_CLK_OUT;         // Enable the clock output of the DSC
output    NORM_UPKT;           // Non-training micro-packet detected
output    MEAS_CLK_PER_8B;     // Start of a non-training upkt in 8b mode
output    MEAS_CLK_PER_16B;    // Start of a non-training upkt in 16b mode
output    LSSD_SO;             // Testability output
wire      CLK_500MHZ_H;
wire      CLK_500MHZ_L;
wire      SUMAC_RESET_L;
wire      SIM_RESET_L;
wire      DSC_ENB;
wire      AC_WIDTH16;
wire      CLK_IN;
wire      CLK_OUT;
wire      ALL_PRESENT;
wire      SCAN_GATE;
wire      LSSD_A;
wire      LSSD_B;
wire      LSSD_C;
wire      LSSD_SI;
reg       TRAIN_ENB;
reg       TRAIN_ENB_DLY;
reg       ENB_CLK_OUT;
reg       UPDATE_ERROR;
reg       NORM_UPKT;
wire      MEAS_CLK_PER_8B;
wire      MEAS_CLK_PER_16B;
wire      LSSD_SO;
/*
* Module: dsc_cntl
*
* Description: This module is the control portion of the dynamic skew
*         compensation circuit (the DSC). k is implemented as
*         a standard cell RLM in contrast to the custom designed
*         DSCdatapath.
*
* Interfaces: DSC datapath
*
* Major Components:
*         Input synchronization
*         State of operation SM
*         Training micro-packet detection at input
*         Normal micro-packet detection
*         Training micro-packet detection at output
*         ENB_CLK_OUT generation
*
/* Internal nets */
wire      [4:0] rst_sync;
wire      [4:0] enb_sync;
wire      [4:0] ap_sync;
wire      nxt_acpt_trn_upkt;
wire      rcvd_trn_upkt;
wire      rcvd_norm_upkt;
reg       acpt_trn_upkt;
wire      acpt_norm_upkt;
wire      clk_in_sg;
reg       clki_div2;
wire      clki_src;
wire      clki_src_sg;
wire      clki_src_l;
wire      clki_src_sg_l;
wire      [5:0] clki_sync_h;
wire      [5:0] clki_sync_l;
wire      nxt_clki_const;
reg       clki_const;
wire      set_trn_enbi;
wire      clr_trn_enbi;
wire      nxt_trn_enbi;
reg       trn_enbi;
wire      nxt_clki_tgl;
reg       clki_tgl;
wire      set_norm_upkt;
wire      ck_norm_upkt;
wire      nxt_norm_upkt;
```

-continued

```
reg      norm_upkt_r;
reg      [2:0] norm_cnt;
wire     nxt_norm_tmr_done;
reg      norm_tmr_done;
wire     clk_out_sg;
reg      clko_div2;
wire     clko_src;
wire     clko_src_l;
wire     [3:0] clko_sync_h;
wire     [3:0] clko_sync_l;
wire     nxt_clko_const;
reg      clko_const;
wire     set_trn_enbo;
wire     ck_trn_enbo;
wire     nxt_trn_enbo;
reg      [3:0] trn_cnt;.
wire     nxt_trn_tmr_done;
reg      trn_tmr_done;
reg      [6:0] ap_dly;
/* Synchronize inputs
*
*/
D_F_LMS0101_A sync_rst_0 (.L2(rst_sync[0]), .D(~SLMAC_RESET_L), .E(CLK_500MHZ_H));
D_F_LMS0101_A sync_rst_1 (.L2(rst_sync[1]), .D(rst_sync[0]), .E(CLK_500MHZ_H));
D_F_LMS0101_A sync_rst_2 (.L2(rst_sync[2]), .D(rst_sync[1]), .E(CLK_500MHZ_H));
D_F_LMS0101_A sync_rst_3 (.L2(rst_sync[3]), .D(rst_sync[2]), .E(CLK_500MHZ_H));
D_LDM0001_A sync_rst_4 (.L2(rst_sync[4]), .D(rst_sync[3]), .E(CLK_500MHZ_H));
D_F_LMS0101_A sync_enb_0 (.L2(enb_sync[0]), .DSC_ENB), .E(CLK_500MHZ_H));
D_F_LMS0101_A sync_enb_1 (.L2(enb_sync[1]), .D(enb_sync[0]), .E(CLK_500MHZ_H));
D_F_LMS0101_A sync_enb_2 (.L2(enb_sync[2]), .D(enb_sync[1]), .E(CLK_500MHZ_H));
D_F_LMS0101_A sync_enb_3 (.L2(enb_sync[3]), .D(enb_sync[2]), .E(CLK_500MHZ_H));
D_LDM0001_A sync_enb_4 (.L2(enb_sync[4]), .D(enb_sync[3]), .E(CLK_500MHZ_H));
D_F_LMS0101_A sync_ap_0 (.L2(ap_sync[0]), .D(ALL_PRESENT), .E(CLK_500MHZ_H));
D_F_LMS0101_A sync_ap_1 (.L2(ap_sync[1]), .D(ap_sync[0]), .E(CLK_500MHZ_H));
D_F_LMS0101_A sync_ap_2 (.L2(ap_sync[2]), .D(ap_sync[1]), .E(CLK_500MHZ_H));
D_F_LMS0101_A sync_ap_3 (.L2(ap_sync[3]), .D(ap_sync[2]), .E(CLK_500MHZ_H));
D_LDM0001_A sync_ap_4 (.L2(ap_sync[4]), .D(ap_sync[3]), .E(CLK_500MHZ_H));
/* SM for state of operation
*/
// Reset dominant sync SR latch: D = ~R & (S | Q)
assign nxt_acpt_trn_upkt = ~(rst_sync[4] | rcvd_trn_upkt)
         & (rcvd_norm_upkt | acpt_trn_upkt);
assign rcvd_trn_upkt = set_trn_enbo;
assign rcvd_norm_upkt = set_norm_upkt;
always @ (posedge CLK_500MHZ_H)
   acpt_trn_upkt <= #('GATE_DLY) nxt_acpt_trn_upkt;
assign acpt_norm_upkt = ~acpt_trn_upkt;
/* Detect training micro-packets at input
*
*/
// Divide clock input by 2, select proper source
assign clk_in_sg = CLK_IN | SCAN_GATE;
always @ (posedge clk_in_sg)
clki_div2 <= (~SIM_RESET_L | clki_div2);
assign clki_src = AC_WIDTH16 ? CLK_IN: clki_div2;
// Sample with active-low clock
D_F_LMS0101_A reg_clki_src_l (.L2(clki_src_l), .D(clki_src), .E(CLK_500MHZ_L));
/* Synchronize
*/
D_F_LMS0101_A sync_clkih_0 (.L2(clki_sync_h[0]), .D(clki_src ), .E(CLK_500MHZ_H));
D_F_LMS0101_A sync_clkih_1 (.L2(clki_sync_h[1]), .D(clki_sync_h[0]), .E(CLK_500MHZ_H));
D_F_LMS0101_A sync_clkih_2 (.L2(clki_sync_h[2]), .D(clki_sync_h[1]), .E(CLK_500MHZ_H));
D_F_LMS0101_A sync_clkih_3 (.L2(clki_sync_h[3]), .D(clki_sync_h[2]), .E(CLK_500MHZ_H));
D_LDM0001_A sync_clkih_4 (.L2(clki_sync_h[4]), .D(clki_sync_h[3]), .E(CLK_500MHZ_H));
D_LDM0001_A sync_clkih_5 (.L2(clki_sync_h[5]), .D(clki_sync_h[4]), .E(CLK_500MHZ_H));
D_F_LMS0101_A sync_clkil_0 (.L2(clki_sync_l[0]), .D(clki_src_l ), .E(CLK_500MHZ_H));
D_F_LMS0101_A sync_clkil_1 (.L2(clki_sync_l[1]), .D(clki_sync_l[0]), .E(CLK_500MHZ_H));
D_F_LMS0101_A sync_clkil_2 (.L2(clki_sync_l[2]), .D(clki_sync_l[1]), .E(CLK_500MHZ_H));
D_F_LMS0101_A sync_clkil_3 (.L2(clki_sync_l[3]), .D(clki_sync_l[2]), .E(CLK_500MHZ_H));
D_LDM0001_A sync_clkil_4 (.L2(clki_sync_l[4]), .D(clki_sync_l[3]), .E(CLK_500MHZ_H));
D_LDM0001_A sync_clkil_5 (.L2(clki_sync_l[5]), .D(clki_sync_l[4]), .E(CLK_500MHZ_H));
// Detect training upkts -- 11 or 00 pattern in both synchronizers
assign nxt_clki_const = & {clki_sync_h[3:2], clki_sync_l[3:2]}
         |& {~clki_sync_h[3:2], ~clki_sync_l[3:2]};
always @ (posedge CLK_500MHZ_H)
   clki_const <= #('GATE_DLY) nxt_clki_const;
// Generate TRAIN_ENB -- reset dominant sync SR latch: D = ~R & (S | Q)
assign set_trn_enbi = acpt_trn_upkt & clki_const;
assign clr_trn_enbi = rst_sync[4] | TRAIN_ENB;
assign nxt_trn_enbi = ~clr_trn_enbi & (set_trn_enbi | trn_enbi);
```

-continued

```
always @ (posedge CLK_500MHZ_H)
   trn_enbi <= #('GATE_DLY) nxt_trn_enbi;
/* Detect normal micro-packets */
// Detect normal upkts -- 010 pattern in either synchronizer
assign nxt_clki_tgl = & ~clki_sync_h[5],clki_sync_h[4],~clki_sync_h[3]}
      |& {~clki_sync_l[5],clki_sync_l[4],~clk_sync_l[3]};
always @ (posedge CLK_500MHZ_H)
   clki_tgl <= #('GATE_DLY) nxt_clki_tgl;
// Generate MEAS_CLK_PER_*B -- reset dominant sync SR latch: D = ~R & (S | Q)
assign set_norm_upkt = acpt_norm_upkt & clki_tgl;
assign clr_norm_upkt = rst_sync[4] | norm_tmr_done;
assign nxt_norm_upkt = ~clr_norm_upkt & (set_norm_upkt | NORM_UPKT);
always @ (posedge CLK_500MHZ_H)
NORM_UPKT <= #('GATE_DLY) nxt_norm_upkt;
assign MEAS_CLK_PER_8B = NORM_UPKT & ~AC_WIDTH16;
assign MEAS_CLK_PER_16B = NORM_UPKT & AC_WIDTH16;
always @ (posedge CLK_500MHZ_H) begin
   norm_cnt[0] <= #('GATE_DLY) ~NORM_UPKT | (norm_cnt[0] ^ norm_cnt[2]);
   norm_cnt[1] <= #('GATE_DLY) ~NORM_UPKT | norm_cnt[0];
   norm_cnt[2] <= #('GATE_DLY) ~NORM_UPKT | norm_cnt[1];
end
assign nxt_norm_tmr_done = AC_WIDTH16 ? (norm_cnt ==3'b100)
         : (norm_cnt = 3'b110);
always @ (posedge CLK_500MHZ_H)
   norm_tmr_done <= #('GATE_DLY) nxt_norm_tmr_done;
/* Detect training micro-packets at output */
// Divide clock output by 2, select proper source
assign clk_out_sg = CLK_OUT | SCAN_GATE;
always @ (posedge clk_out_sg)
   clko_div2 <=~(~SIM_RESET_L | clko_div2);
assign clko_src = AC_WIDTH16 ? CLK_OUT: clko_div2;
// Sample with active-low clock
D_F_LMS0101_A reg_clkoh_src_l (.L2(clko_src_l), .D(clko_src), .E(CLK_500MHZ_L));
// Synchronize
D_F_LMS0101_A sync_clkoh_0 (.L2(clko_sync_h[0]), .D(clko_src), .E(CLK_500MHZ_H));
D_F_LMS0101_A sync_clkoh_1 (.L2(clko_sync_h[1]), .D(clko_sync_h[0]),
.E(CLK_500MHZ_H));
D_F_LMS0101_A sync_clkoh_2 (.L2(clko_sync_h[2]), .D(clko_sync_h[1]),
.E(CLK_500MHZ_H));
D_F_LMS0101_A sync_clkoh_3 (.L2(clko_sync_h[3]), .D(clko_sync_h[2]),
.E(CLK_500MHZ_H));
D_F_LMS0101_A sync_clkol_0 (.L2(clkol_sync_l[0]), .D(clko_src_l ), .E(CLK_500MHZ_H));
D_F_LMS0101_A sync_clkol_1 (.L2(clko_sync_l[1]), .D(clko_sync_l[0]), .E(CLK_500MHZ_H));
D_F_LMS0101_A sync_clkol_2 (.L2(clko_sync_l[2]), .D(clko_sync_l[1]), .E(CLK_500MHZ_H));
D_F_LMS0101_A sync_clkol_3 (.L2(clko_sync_l[3]), .D(clko_sync_1[2]), .E(CLK_500MHZ_H));
// Detect training upkts -- 11 or 00 pattern in both synchronizers
assign nxt_clko_const = & { clko_sync_h[3:2], clko_sync_l[3:2]}
      | & { clko_sync_h[3:2],~clko_sync_l[3:2]};
always @ (posedge CLK_500MHZ_H)
   clko_const <= #('GATE_DLY) nxt_clko_const;
// Generate TRAIN_ENB and TRAIN_ENB_DLY
assign set_trn_enbo = trn_enbi & clko_const;
assign ck_trn_enbo = rst_sync[4] | ap_sync[4]| trn_tmr_done;
assign nxt_trn_enbo = ~clr_trn_enbo & (set_trn_enbo | TRAIN_ENB);
always @ (posedge CLK_500MHZ_H) begin
   TRAIN_ENB <= #('GATE_DLY) nxt_trn_enbo;
   TRAIN_ENB_DLY <= #('GATE_DLY) TRAIN_ENB;
end
always @ (posedge CLK_500MHZ_H) begin
   trn_cnt[0] <= #('GATE_DLY) ~TRAIN_ENB | (trn_cnt[0] ^ trn_cnt[3]);
   trn_cnt[1] <= #('GATE_DLY) ~TRAIN_ENB | trn_cnt[0];
   trn_cnt[2] <= #('GATE_DLY) ~TRAIN_ENB | trn_cnt[1];
   trn_cnt[3] <= #('GATE_DLY) ~TRAIN_ENB | trn_cnt[2];
end
assign nxt_trn_tmr_done = (trn_cnt ==4'b0001);
always @ (posedge CLK_500MHZ_H)
   trn_tmr_done <= #('GATE_DLY) nxt_trn_tmr_done;
/* Generate ENB_CLK_OUT
*/
always @ (posedge CLK_500MHZ_H) begin
   ap_dly[0] <= #('GATE_DLY) ap_sync[4]| trn_tmr_done;
   ap_dly[1] <= #('GATE_DLY) ap_dly[0];
   ENB_CLK_OUT <= #('GATE_DLY) rst_sync[4] | ~enb_sync[4] | (ap_dly[0] & ap_dly[1]);
end
endmodule /* dsc_cntl */
```

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A skew compensation circuit, comprising:
   a receiver adapted to accept data from a parallel data transfer cable;
   a plurality of channel inputs included in the receiver, the plurality of channel inputs for coupling to a corresponding plurality of communications channels of the parallel data transfer cable;
   a delay stack structure included in the receiver, the delay stack structure coupled to each of the plurality of channel inputs and having a corresponding plurality of data outputs, the delay stack structure adapted to add a delay to each of the plurality of channel inputs, the delay respectively sized such that data received via the plurality of channel inputs is deskewed and output via the plurality of data outputs, wherein the delay stack structure is adapted to receive a training signal via the plurality of communications channels to measure a skew of each of the plurality of communications channels and to determine the size of the delay therefrom.

2. The skew compensation circuit from claim 1, further comprising:
   a controller circuit coupled to the receiver to control the operation of the receiver and the delay stack structure.

3. The skew compensation circuit from claim 1, wherein the delay stack structure is adapted to continually adjust the delay such that data output via the plurality of data outputs remains deskewed as a skew caused by the parallel data transfer cable changes.

4. The skew compensation circuit from claim 1, further comprising:
   a plurality of delay stacks included within the delay stack structure, the plurality of delay stacks respectively coupled to the plurality of channel inputs and the plurality of data outputs, each of the plurality of delay stacks adapted to add a respective delay to a respective one of the plurality of delay inputs such that data received via the plurality of channel inputs is deskewed and output via the plurality of data outputs.

5. The skew compensation circuit from claim 4, further comprising:
   a plurality of delay lines respectively included within each of the plurality of delay stacks, each delay line coupled to a respective one of the plurality of channel inputs and a respective one of the plurality of data outputs, each delay line adapted to add a variable delay to the respective one channel input, the variable delay for adjusting for a skew of the parallel data transfer cable such that data output via the plurality of data outputs remains deskewed as a skew caused by the parallel data transfer cable changes.

6. The skew compensation circuit from claim 5, further comprising:
   a plurality of taps respectively included within each of the plurality of delay lines, each tap adapted to add an incremental delay to the respective one channel input to generate the variable delay.

7. The skew compensation circuit from claim 6, wherein each of the plurality of taps includes at least one delay element, the at least one delay element sized to add a determinate amount of delay such that each additional delay element adds the incremental delay.

8. The skew compensation circuit from claim 6, wherein each of the taps is a pair of inverters.

9. A skew compensation circuit, comprising:
   a receiver adapted to accept an input data word from a parallel data transfer cable via a plurality of channel inputs, the input data word transmitted via a plurality of communications channels comprising the parallel data transfer cable; and
   a delay stack structure included in the receiver, the delay stack structure coupled to each of the plurality of channel inputs and having a corresponding plurality of data outputs, the delay stack structure adapted to add a delay to each bit of the input data word, the delay respectively sized such that each bit of the input data word is deskewed, generating a deskewed output data word, the deskewed output data word transmitted via the plurality of data outputs, wherein the size of the delay is determined by receiving a training signal via the plurality of communications channels to measure a skew of each of the plurality of communications channels.

10. The skew compensation circuit from claim 9, further comprising:
    a plurality of delay stacks included within the delay stack structure, the plurality of delay stacks respectively coupled to the plurality of channel inputs and the plurality of data outputs, each of the plurality of delay stacks adapted to add a respective delay to a respective one bit of the input data word to generate the deskewed output data word.

11. The skew compensation circuit from claim 10, wherein at least one of the plurality of delay stacks included within the delay stack structure is adapted to add a delay to a clock signal coupled to its respective one of the plurality of channel inputs to place the edge of said clock signal such that the output data word can be sampled using the edge of said clock signal.

12. The skew compensation circuit from claim 11, further comprising:
    a plurality of delay lines respectively included within each of the plurality of delay stacks, each delay line coupled to a respective one of the plurality of channel inputs;
    a plurality of multiplexers respectively coupled to each of the plurality of delay lines, each multiplexer adapted to implement a signal path from the respective one channel input to a respective one of the plurality of data outputs, the signal path adjusted along each delay line to size the delay.

13. The skew compensation circuit from claim 12, further comprising:
    a plurality of taps respectively included within each of the plurality of delay lines, each tap adapted to add an incremental delay to the respective one channel input when added to the signal path by the multiplexer.

14. The skew compensation circuit from claim 13, wherein each of the plurality of taps includes at least one delay element, the at least one delay element sized to add a determinate amount of delay such that each additional delay element adds the incremental delay.

15. The skew compensation circuit from claim 14, wherein each of the taps is a pair of inverters.

16. An adjustable delay stack for skew compensation in a communications channel, comprising:
   a first delay line adapted to conduct a first bit from a first input;
   a second delay line adapted to conduct a second bit from a second input;
   a first multiplexer coupled to the first delay line, the first multiplexer having a first output, the first multiplexer adapted to implement a first variable signal path along the first delay line from the first input to the first output;
   a second multiplexer coupled to the second delay line, the second multiplexer having a second output, the second multiplexer adapted to implement a second variable signal path along the second delay line from the second input to the second output, the first variable signal path and the second variable signal path adjusted such that the first bit and the second bit are transmitted from the first output and the second output synchronously.

17. The delay stack from claim 16, further comprising:
   a plurality of taps included within the first delay line, each of the plurality of taps adapted to add an incremental delay such that when included in the first variable signal path, a delay is respectively added to the first variable signal path.

18. The delay stack from claim 16, further comprising:
   a plurality of taps included within the second delay line, each of the plurality of taps adapted to add an incremental delay such that when included in the second variable signal path, a delay is respectively added to the second variable signal path.

19. The delay stack from claim 16, wherein the first delay line and the second delay line each include a plurality of taps, each of the plurality of taps including at least one delay element.

20. The delay stack from claim 16, further comprising:
   a plurality of latches each coupled to the first delay line; and
   a decoder coupled to each of the latches and to the first multiplexer, the latches adapted to record the progress of a ping sequence through the first delay line, the progress of the ping sequence used by the decoder to control the multiplexer and control the first variable signal path.

21. The delay stack from claim 16, further comprising:
   a plurality of latches each coupled to the second delay line; and
   a decoder coupled to each of the latches and to the second multiplexer, the latches adapted to record the progress of a ping sequence through the second delay line, the progress of the ping sequence used by the decoder to control the multiplexer and control the second variable signal path.

22. The delay stack from claim 16, wherein a controller circuit controls the adjusting of the first variable signal path and the adjusting of the second variable signal path.

23. In a skew compensation circuit, a method for removing channel to channel skew from data received from a parallel data transmission cable, the method comprising the steps of:
   a) sending a training micropacket from a transmitter to a delay stack structure via a plurality of channels of a parallel data transmission cable;
   b) adjusting skew compensation for the plurality of channels based upon the training micropacket;
   c) sending a normal micropacket from the transmitter to the delay stack;
   d) performing clock edge placement on a clock signal transmitted on one of the plurality of channels; and
   e) sampling skew compensated data from the delay stack using the clock signal after clock edge placement.

24. The method of claim 23, wherein step a) includes the step of sending a ping sequence from the transmitter to the delay stack to characterize the skew present in each of the plurality of channels.

25. The method of claim 24, wherein step b) includes adjusting the skew compensation based upon the progress of the ping sequence through the delay stack.

26. The method of claim 25 wherein step c) includes sending a normal micropacket wherein the normal micropacket includes a plurality of data bits and the clock signal for sampling the plurality of data bits.

27. The method of claim 26 wherein step d) includes the step of measuring the period of the clock signal.

28. The method of claim 27 wherein step d) includes adding a delay, equal to a portion of the period of the clock signal, to the clock signal.

29. The method of claim 23 further including the step b) further includes taking a snapshot of the contents of a delay line by closing a set of coupled latches upon receipt of a ping sequence in a slowest communications channel.

30. The method of claim 29 further including the step of providing a clock offset for the clock edge placement by taking an equivalent snapshot, wherein the latches are closed a portion of a clock period later.

* * * * *